United States Patent [19]

Horner

[11] Patent Number: 5,438,632

[45] Date of Patent: Aug. 1, 1995

[54] JOINT TRANSFORM CORRELATOR USING A 4-F LENS SYSTEM TO ACHIEVE VIRTUAL DISPLACEMENT ALONG THE OPTICAL AXIS

[75] Inventor: Joseph L. Horner, Belmont, Mass.

[73] Assignee: The United States of America as represented by the Secretary of the Air Force, Washington, D.C.

[21] Appl. No.: 83,151

[22] Filed: Jun. 25, 1993

[51] Int. Cl.⁶ .................. G06F 15/336; G06K 9/64
[52] U.S. Cl. .................. 382/278; 359/561; 382/280
[58] Field of Search .............. 382/31, 42, 43; 359/559, 561; 364/822; 250/550

[56] References Cited

U.S. PATENT DOCUMENTS

| | | | |
|---|---|---|---|
| 4,084,255 | 4/1978 | Casasent et al. | 382/42 |
| 4,204,262 | 5/1980 | Fitelson et al. | 364/822 |
| 4,723,125 | 2/1988 | Elleaume | 342/194 |
| 4,826,285 | 5/1989 | Horner | 359/561 |
| 4,831,598 | 5/1989 | Koike et al. | 367/7 |
| 4,832,447 | 5/1989 | Javidi | 359/561 |
| 4,922,256 | 5/1990 | Brandstetter | 342/132 |
| 5,073,066 | 12/1991 | Horner et al. | 359/561 |

OTHER PUBLICATIONS

Tang and Javidi, "Technique for reducing the redundant and self-correlation terms in joint transform correlators", Applied Optics, 10 Apr. 1993, vol. 32, No. 11, pp. 1911-1918.

Primary Examiner—Joseph Mancuso
Assistant Examiner—Gerard Del Rosso
Attorney, Agent, or Firm—Robert L. Nathans; Stanton E. Collier

[57] ABSTRACT

A 4-f lens system is positioned over one half of the joint input image presentation SLM device of a conventional joint transform correlator (JTC). An image displacement lens is positioned in the Fourier transform plane of the 4-f correlator and can shift the virtual displacement of the reference image plane relative to the input image plane. By the appropriate choice of this lens, any virtual displacement can be achieved to provide for substantial design flexibility of the JTC.

10 Claims, 1 Drawing Sheet

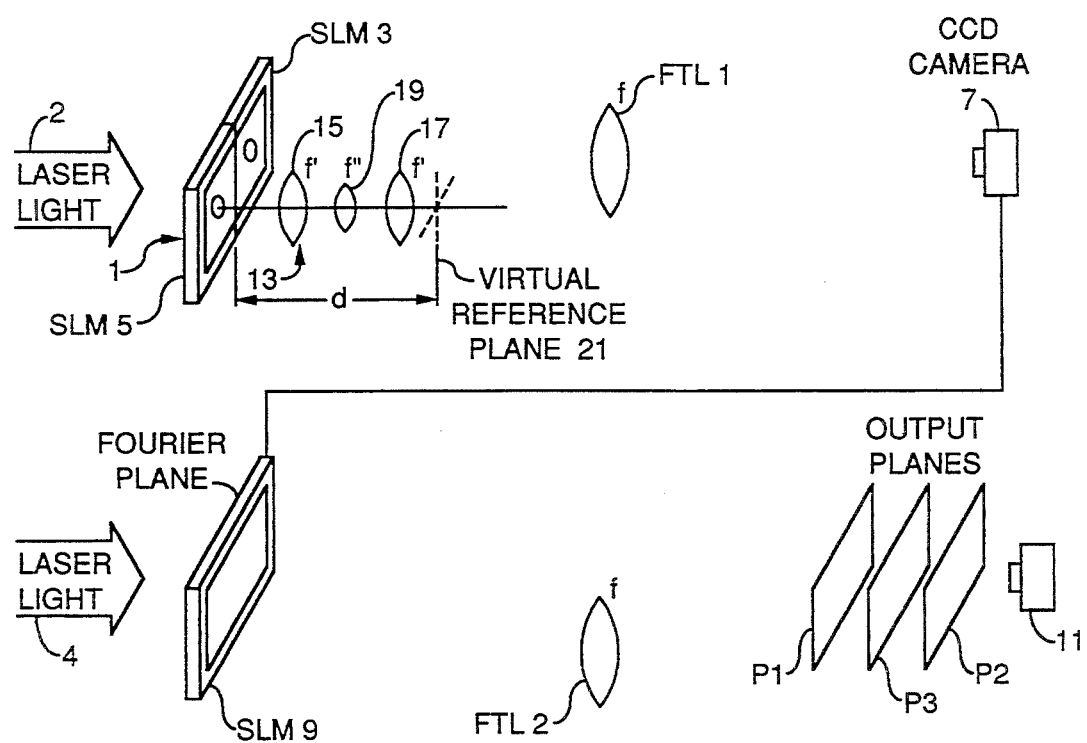

JOINT TRANSFORM CORRELATOR USING A 4-F LENS SYSTEM TO ACHIEVE VIRTUAL DISPLACEMENT ALONG THE OPTICAL AXIS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical correlators and more particularly to joint transform correlators.

In a conventional joint transform correlator (JTC), the input signal to be identified, usually a two dimensional image of a scene, and the reference signal to be compared to the input signal, are displayed in the same plane. The output of the JTC consists of a term which is the sum of the autocorrelation of the input scene and the autocorrelation of the reference signal that is formed on the optical axis (DC terms). The other two terms are the cross-correlation functions between the input signal and the reference signal that are diffracted off-axis. These two cross-correlation terms are positioned away from the optical axis and are symmetrical thereto. They indicate the presence and the locations of identified input targets. JTC are well known in the art; see for example U.S. Pat. No. 4,695,973, issued to Francis T. S. Yu, and U.S. Pat. No. 4,832,447 issued to Bahram Javidi.

Ideally, a correlation peak would occur in the JTC output plane only at the location of each target in the input scene. However, if there are multiple targets in the input scene, it is well known that spurious auto-correlation signals can be generated among these multiple targets themselves, each correlating with one another in all permutations and combinations. One example of this is a scene with many prominent repetitions of a feature, such as a picture of a house with a picket fence. This causes false alarms and degrades the performance and reliability of the JTC.

A copending allowed patent application, entitled METHOD OF REMOVING SPURIOUS RESPONSES FROM OPTICAL JOINT TRANSFORM CORRELATORS, application Ser. No. 08/083,152, filed Jun. 25, 1993, and assigned to the same assignee as the present invention, discloses a technique for eliminating the aforesaid problem posed by the spurious correlation signals. This technique (hereinafter the Javidi invention) is also disclosed in substantial detail in "Technique for Reducing the Redundant and Self-Correlation terms in Joint Transform Correlators", Tang and Javidi, Applied Optics, 10 Apr. 1993, Vol. 32, No. 11, pages 1911-1918. The Javidi invention causes the optical path length between the reference image plane and the Fourier transform lens to differ from the optical path length between the input image plane and the Fourier transform lens. This produces three principal output correlation planes. The optical path difference is such as to focus a first off-axis true correlation peak signal in a first output plane of the JTC and a second off-axis true correlation signal in a second plane separated from the first output plane. The spurious correlation peaks which cause false alarms, will not appear in these output planes but instead in a third plane situated midway between the aforesaid first and second planes. Thus, only correlation peaks resulting from features in the reference image correlating with features in the input scene image will be in focus in the output plane. In the principle embodiment of the Javidi invention, the reference image plane is physically displaced along the optical axis relative to the input image plane. In a second embodiment, both input images lie in the same plane so that a single spatial light modulator (SLM) can be used and a rectangular block of glass is positioned in front of the reference image to create the desired optical path length difference.

It is deemed desirable to provide an alternative technique for providing a virtual displacement of the JTC reference image plane relative to the input image plane to solve the aforesaid problem discussed above in connection with the Javidi invention. A simple system is desired to produce the virtual input displacement and whereby the length of the virtual displacement can be easily varied over a substantial range to provide for considerable flexibility in the design parameters selected for the JTC and thus a substantial reduction of JTC design constraints.

BRIEF SUMMARY OF THE INVENTION

In accordance with the present invention, a pair of Fourier transform lenses are positioned to form a 4f telecentric lens system which is positioned in either the reference image path or the input scene path of a conventional JTC. This 4f lens system provides a virtual displacement of half of the JTC input plane for a distance equal to the length of the 4f correlator. An additional virtual displacement adjusting lens can be positioned in the frequency plane of the 4f lens system and its focal length will determine a particular virtual displacement. Simply by substituting different focal length lenses, a wide range of variation in the virtual displacement is attainable and the designer can thus quickly and easily place the virtual plane just where he wants it, thereby to provide great design flexibility.

BRIEF DESCRIPTION OF THE DRAWING

The various features of the invention will become more apparent upon study of the following description taken in conjunction with the sole figure showing a preferred embodiment of the invention.

DETAILED DESCRIPTION OF PREFERRED EMBODIMENTS OF THE INVENTION

Referring now to the sole Figure, a joint image production means 1 comprises a first SLM 5 having a reference image stored therein and a second SLM 3 having an input image stored therein. A single large SLM could replace the two SLMs shown since they lie in the same plane. Beneficially, this enables the use of a single SLM in contrast to the requirement for two SLMs in the principal embodiment of the Javidi invention. A coherent light beam 2 illuminates both input SLMs with collimated light. A first Fourier transform lens means FTL1 produces an interference pattern between Fourier transforms of the reference image and the input image, which interference pattern is directed at an energy detector which can comprise CCD camera 7, which is a square law detector, whose output is inserted into SLM 9. The output from SLM 9 is a light pattern comprising a Fourier transform interference intensity distribution signal which is inverse Fourier transformed by Fourier transform lens device FTL2 to produce the desired true cross-correlation peaks in separate planes P1 and P2 positioned on either side of centrally positioned plane P3. Plane P3 contains the undesired innerproduct or spurious correlation signals. The true or desired correlation signals in plane P2 can be detected by a CCD camera 11. This previously discussed highly desired goal of thus separating the spurious signals from the desired signals is effected by producing a virtual displacement of the reference image plane relative to the input image plane as explained in the aforesaid co-pending patent application and in the Tang/Javidi paper.

In the following equations in the specification, the following terms have the following meanings:

"*" in equation (1) is the standard mathematical notation for the complex conjugate; and x,y coordinates in input and correlation plane
$\alpha, \beta$ coordinates in transform plane
r(x,y) reference signal amplitude in input plane
s(x,y) scene signal amplitude in input plane
i(x,y) combined signal amplitude in input plane
$\lambda$ optical wavelength
f focal length of main JTC lens
f' focal length of 4-f lenses
f'' focal length of compensating lens in 4-f subsystem
$R(\alpha/\lambda f, \beta/\lambda f)$ reference signal amplitude in Fourier plane
$S(\alpha/\lambda f, \beta/\lambda f)$ scene signal amplitude in Fourier plane
$T(\alpha,\beta)$ combined power spectrum intensity in Fourier plane
$x_o$ x displacement of input plane images
o(x,y) correlation plane amplitude If we consider the input to be $r(x-x_o,y)+s(x+x_o,y)$, the detected signal in the fourier plane is:

$$T(\alpha,\beta) = |F\{i(x,y)\}|^2 = \left|R\left(\frac{\alpha}{\lambda f}\right)\right|^2 + \left|S\left(\frac{\alpha}{\lambda f}\right)\right|^2 + R^*\left(\frac{\alpha}{\lambda f}\right)S\left(\frac{\alpha}{\lambda f}\right)\exp\left(-2j\frac{\alpha x_o}{\lambda f}\right) + R\left(\frac{\alpha}{\lambda f}\right)S^*\left(\frac{\alpha}{\lambda f}\right)\exp\left(2j\frac{\alpha x_o}{\lambda f}\right) \quad (1)$$

Where R is the fourier transform of the reference input r(x,y) and S is the transform of the scene s(x,y). This results in the output:

$$o(x,y)=r(x,y)*r(x,y)+s(x,y)*S(x,y)+r(x-x_o,y)*S(x+x_o,y)+r(x+x_o,y)*S(x-x_o,y) \quad (2)$$

If the reference scene is displaced by a distance $z_o$ along the optical axis in the direction away from the transform lens, the signal detected in the transform plane becomes:

$$T(\alpha,\beta) = |F\{i(x,y)\}|^2 = \left|R\left(\frac{\alpha}{\lambda f}\right)\right|^2 + \left|S\left(\frac{\alpha}{\lambda f}\right)\right|^2 + R^*\left(\frac{\alpha}{\lambda f}\right)S\left(\frac{\alpha}{\lambda f}\right)\exp\left(-2j\frac{\alpha x_o}{\lambda f}\right)\exp\left(j\frac{kz_o}{2f^2}(\alpha^2+\beta^2)\right) + \quad (3)$$

$$R\left(\frac{\alpha}{\lambda f}\right)S^*\left(\frac{\alpha}{\lambda f}\right)\exp\left(2j\frac{\alpha x_o}{\lambda f}\right)\exp\left(-j\frac{kz_o}{2f^2}(\alpha^2+\beta^2)\right)$$

As a result of the displacement, the cross product terms have been modulated in the fourier plane by a factor determined by the square of the distance of their spatial frequencies from the origin in the $\alpha$, B plane. (Because of the similarity between this spatial modulation and the temporal modulation of a linear chirp radar waveform, Javidi has often referred to this as a chirp encoded JTC.) In the plane a distance $z_o$ closer to the transform lens than the normal output we find the signal:

$$o(x,y) = [r(x,y)*r(x,y) + \quad (4)$$

$$s(x,y)*s(x,y)] \; F\left\{\exp\left(\frac{kz_o}{2f^2}(\alpha^2+\beta^2)\right)\right\} +$$

$$[r(x+x_o,y)*s(x-x_o,y)] \; F\left\{\exp\left(\frac{kz_o}{f^2}(\alpha^2+\beta^2)\right)\right\} +$$

$$[r(x-x_o,y)*s(x+x_o,y)]$$

Here * represents correlation and ⊕ represents convolution.

The means for providing the virtual displacement of the reference image plane relative to the input image plane in accordance with the present invention comprises 4f lens system 13 having a third and fourth Fourier transform lens 15 and 17 straddling the Fourier transform plane therebetween. This 4f lens system is similar to a 4f Fourier transform correlator system but with lens 19 replacing the usual spatial filter. The 4f lens system is positioned so as to Fourier transform only one image such as the reference image displayed by SLM 5 of the joint image production means 1. The displacement adjusting lens 19 is positioned at the 4f lens system Fourier transform plane.

If the 4f lens system is placed in the optical path on the reference side of the correlator, as shown in the Figure, the virtual image of the reference is inverted and moved toward the main Fourier lens FTL1 by a distance equal to the length of the 4f correlator 13, provided that lens 19 is not present in the system. If lens 19 is present in the system, the displaced image is still inverted but its position will depend on f'' of lens 19 as shown in the equation to follow. In this way the two input images can be displaced along the optical axis while being displayed on a single SLM in a single plane which is a distinct cost saving advantage of the present invention. Since the 4f system inverts the image we must first invert the reference image to have the result in the output plane indicate the desired correlation rather than convolution. The effect of the 4-f displacement is:

$$T(\alpha,\beta) = \left|R\left(\frac{\alpha}{\lambda f}\right)\right|^2 + \left|S\left(\frac{\alpha}{\lambda f}\right)\right|^2 + \quad (5)$$

$$R^*\left(\frac{\alpha}{\lambda f}\right)S\left(\frac{\alpha}{\lambda f}\right)\exp\left(-2j\frac{\alpha x_o}{\lambda f}\right)\exp\left(j\frac{2kf''}{f^2}(\alpha^2+$$

-continued $$R\left(\frac{\alpha}{\lambda f}\right)S^*\left(\frac{\alpha}{\lambda f}\right)\exp\left(2j\frac{\alpha x_o}{\lambda f}\right)\exp\left(-j\frac{2kf}{2f^2}(\alpha^2+\beta^2)\right)\Bigg\}+\quad\beta^2)\Bigg\}+$$

As mentioned above in the summary of the invention, the virtual displacement produced by the 4-f system can be modified by placing lens 19 in the Fourier plane. The effect of this lens is a spherical quadratic phase multiplied with the Fourier transform of the image in the output plane of the 4-f system; this is seen as a convolution of the Fourier transform of the quadratic phase and the original image. The input image projected in the 4-f output plane is:

$$i_{z=4f} = [s(-x+x_o, -y)] \; F\left\{\exp\left[\frac{-jk}{2f'}\right](\alpha^2+\beta^2)\right\} \quad (6)$$

$\alpha'$ and $\beta'$ are coordinates in the 4-f fourier plane. The effect of this is simply a second virtual displacement of the input. Combining the displacement terms in the fourier plane yields:

$$T(\alpha,\beta) = |F\{i(x,y)\}|^2 = \quad (7)$$

$$\left|R\left(\frac{\alpha}{\lambda f}\right)\right|^2 + \left|S\left(\frac{\alpha}{\lambda f}\right)\right|^2 +$$

$$R^*\left(\frac{\alpha}{\lambda f}\right)S\left(\frac{\alpha}{\lambda f}\right)\exp\left(-2j\frac{\alpha x_o}{\lambda f}\right)\exp\left[jk\left(\frac{2f}{f^2}+\frac{-1}{2f'}\right)(\alpha^2+\beta^2)\right]+$$

$$R\left(\frac{\alpha}{\lambda f}\right)S^*\left(\frac{\alpha}{\lambda f}\right)\exp\left(2j\frac{\alpha x_o}{\lambda f}\right)\exp\left[-jk\left(\frac{2f}{f^2}+\frac{-1}{2f'}\right)(\alpha^2+\beta^2)\right]$$

Because of this, the lenses 15 and 17 having a focal length f', may be chosen to be a size which fits conveniently in the physical space available in the larger system. The inner displacement adjusting lens 19 having a focal length f'' may then be chosen to achieve the desired virtual displacement in accordance with the following equation:

$$d_{vir} = f\left(4 - \frac{f}{f''}\right) \quad (9)$$

It can now be seen that by the appropriate choices of f' and f'' we can make this virtual displacement, the distance between SLM 5 and virtual reference plane 21, whatever we want, in order to give us the desired design flexibility mentioned previously.

The virtual displacement would be 4f in the absence of a lens in the Fourier transform plane. Placing a positive lens 19 in the Fourier transform plane shortens the effective displacement as shown. Note that virtual reference plane 21 is not at the focal distance from lens 17 but is closer to 17 since lens 19 is positive. Conversely, a negative lens would lengthen the effective displacement.

The quantity f'' is determined by the overall size of the system, the resolution of the input SLM 5 and the resolution of CCD camera 7 in the Fourier plane. In order to have a practical system f'' should be 1/5-1/10 of f'. If f'' is greater than ⅕, reference plane 21 would be to the right of FTL1 to render the device inoperative and if f'' is less than 1/10, the lens 19 would have too many aberrations and would not be a practical lens choice.

The effect of the displacement is a spherical quadratic phase shift in the transform (frequency) plane. However, this phase shift becomes quite large at the edges of the image. In order to meet the Nyquist criteria in the transform plane the phase shift should not be larger than pi radians per pixel. Since it is a quadratic phase factor, this effect will be maximum at the edges of the transform plane. If the Nyquist criteria is violated, the effect will be that the signal varies faster than the inter-pixel distance. By using a detector with very fine resolution in the Fourier plane, this effect can be minimized. Optically addressed SLMs are currently available with resolutions which are much higher than the resolutions of the electrically addressed devices used in the input and output planes.

Since other embodiments of the invention will become apparent to the skilled workers in the art, the scope of the invention is to be limited only by the terms in the following claims and art recognized equivalents thereof.

I claim:

1. A joint transform correlator for producing a plurality of joint transform image cross-correlation signals comprising:
    (a) joint image production means for producing a joint image of a reference image at a reference image plane and an input image at an input image plane;
    (b) a first Fourier transform lens means for producing an interference pattern between Fourier transforms of said reference image and said input image;
    (c) an energy detector for receiving said interference pattern and for outputting a light pattern comprising a Fourier transform interference intensity distribution signal;
    (d) a second Fourier transform lens means for receiving said light pattern from said energy detector and for inverse Fourier transforming said light pattern;
    (e) displacement means positioned between said joint image production means and said first Fourier transform lens means for providing a virtual displacement of said reference image plane relative to said input image plane, said displacement means including a 4-f lens system having a third and fourth Fourier transform lens means, straddling a Fourier transform plane therebetween, for Fourier transforming only one image produced by said joint image production means.

2. The joint transform correlator of claim 1 including a displacement adjusting lens having a focal length, said displacement adjusting lens being positioned in the Fourier transform plane of said 4f lens system for enabling a wide range of variation in said virtual displacement.

3. The joint transform correlator of claim 2 wherein the focal length of said displacement adjusting lens is between 1/5-1/10 of the focal lengths of said third and fourth Fourier transform lens means.

4. The joint transform correlator of claim 1 wherein said joint image production means comprises a single spatial light modulator.

5. A joint transform correlator for producing a plurality of joint transform image cross-correlation signals comprising:
(a) joint signal production means for producing a joint signal including a reference signal at a reference signal plane and an input signal at an input signal plane;
(b) a first Fourier transform lens means for producing an interference pattern between Fourier transforms of said reference signal and said input signal;
(c) an energy detector means for receiving said interference pattern and for producing a light pattern comprising a Fourier transform interference intensity distribution signal;
(d) a second Fourier transform lens means for receiving said light pattern from said energy detector means and for inverse Fourier transforming said light pattern;
(e) displacement means positioned between said joint image production means and said first Fourier transform lens means for providing a virtual displacement of said reference signal plane relative to said input signal plane, said displacement means including 4f lens means having a third and fourth Fourier transform lens means, straddling a Fourier transform plane therebetween, for Fourier transforming only one signal produced by said joint image production means.

6. The joint transform correlator of claim 5 including a displacement adjusting lens having a focal length, said displacement adjusting lens being positioned in the Fourier transform plane of said 4f lens system for enabling a wide range of variation in said virtual displacement.

7. The joint transform correlator of claim 6 wherein the focal length of said displacement adjusting lens is between 1/5-1/10 of the focal lengths of said third and fourth Fourier transform lens means.

8. The joint transform correlator of claim 5 wherein said joint signal production means comprises a single spatial light modulator.

9. A method of readily altering the design of a joint transform optical correlator comprising the steps of:
(a) providing a joint transform optical correlator comprising
(a-1) joint image production means for producing a joint image of a reference image at a reference image plane and an input image at an input image plane;
(a-2) a first Fourier transform lens means for producing an interference pattern between Fourier transforms of said reference image and said input image;
(a-3) an energy detector for receiving said interference pattern and for outputting a light pattern comprising a Fourier transform interference intensity distribution signal;
(a-4) a second Fourier transform lens means for receiving said light pattern from said energy detector and for inverse Fourier transforming said light pattern;
(a-5) displacement means positioned between said joint image production means and said first Fourier transform lens means for providing a virtual displacement of said reference image plane relative to said input image plane, said displacement means including 4f lens means having a third and fourth Fourier transform lens means, straddling a Fourier transform plane therebetween, for Fourier transforming only one image produced by said joint image production means; and further including
(a-6) displacement adjusting lens positioned in the Fourier transform plane of said 4f correlator means for enabling a wide range of variation in said virtual displacement;
(b) altering the focal length of said displacement adjusting lens means in order to alter said virtual displacement.

10. The method of claim 9 wherein step (b) includes substituting a second lens having a second focal length for a first lens having a first focal length.

* * * * *